United States Patent [19]

Bessone

[11] Patent Number: 4,687,211

[45] Date of Patent: Aug. 18, 1987

[54] SEALING ASSEMBLY PARTICULARLY FOR RAILWAY AXLE BEARINGS

[75] Inventor: Mario Bessone, Pinerolo, Italy

[73] Assignee: RIV-SKF Officine Di Villar Perosa S.p.A., Italy

[21] Appl. No.: 937,116

[22] Filed: Dec. 2, 1986

[30] Foreign Application Priority Data

Dec. 10, 1985 [IT] Italy .............................. 54192/85[U]

[51] Int. Cl.⁴ ....................... F16J 15/16; F16J 15/447
[52] U.S. Cl. ........................................ 277/50; 277/53; 277/237 R
[58] Field of Search .................................. 277/47–50, 277/53, 54, 165, 166, 237

[56] References Cited

U.S. PATENT DOCUMENTS

| | | | |
|---|---|---|---|
| 887,331 | 5/1908 | Muth | 277/53 X |
| 1,493,598 | 5/1924 | Buckwalter | 277/53 |
| 2,395,359 | 2/1946 | Vedovell | 277/47 X |
| 3,471,158 | 10/1969 | Solins | 277/166 X |
| 4,418,920 | 12/1983 | Belter | 277/50 |
| 4,438,990 | 3/1984 | Schalk et al. | 277/53 X |

*Primary Examiner*—Robert S. Ward
*Attorney, Agent, or Firm*—Steele, Gould & Fried

[57] ABSTRACT

A sealing assembly comprising a rigid sleeve-shaped baffle carrying at one end a removable cover which is also rigid, for closure of the end of the baffle, which internally is also provided with a deformably sealing element provided with radial ribs operable to define a labyrinth seal; an axial lip extends from this element and sealingly cooperates with a seat of the cover, respective axial shoulder means of this latter being simultaneously pressed under pressure against respective bayonet coupling means of the baffle.

6 Claims, 3 Drawing Figures

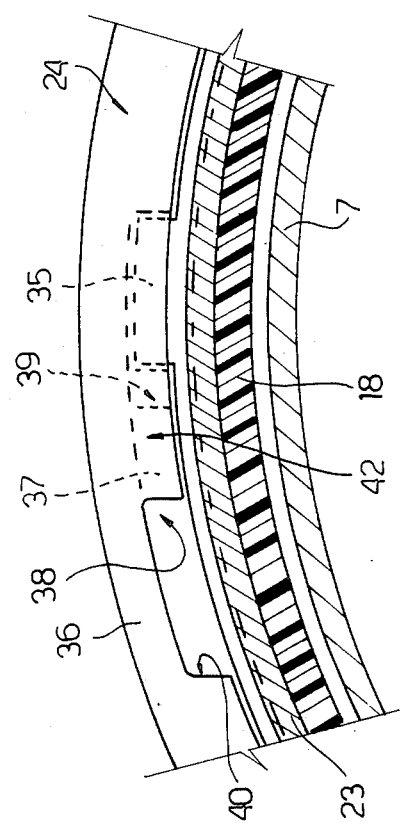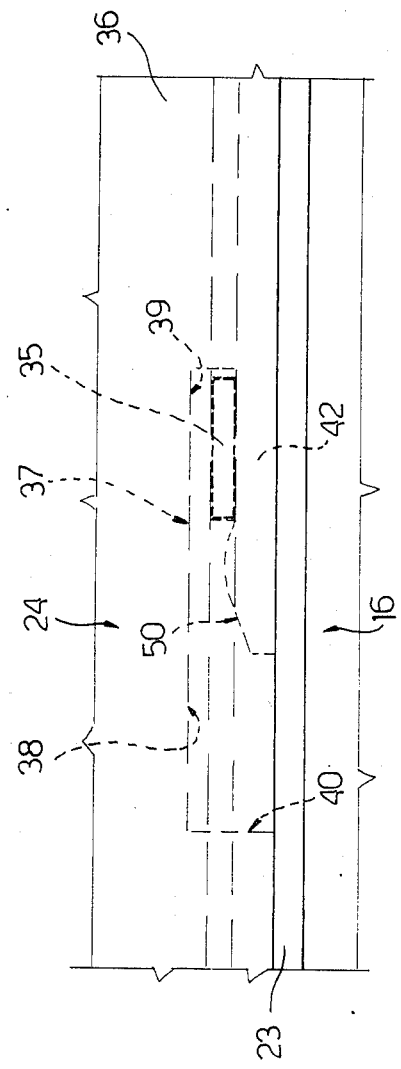

SEALING ASSEMBLY PARTICULARLY FOR RAILWAY AXLE BEARINGS

BACKGROUND OF THE INVENTION

The present invention relates to a sealing assembly which can be interposed between two relatively rotatable members substantially to close an annular cavity defined between the said members in a fluid-tight manner, and particularly relates to a sealing assembly for rolling element bearings of railway axles.

It is known that railway axle bearings, usually of taper roller type, are provided with assemblies for sealing against the escape of lubricant and the ingress of external contaminants, constituted by sealing baffles including a rigid metal baffle fitted onto one of the members in motion, for example the outer ring of the bearing, and a sliding labyrinth seal element cooperating with the other ring of the bearing or with an element of the axle and rigidly connected thereto; this type of sealing assembly has the dual disadvantage of a high operating friction, which is manifest as a very high loss of driving energy, and a rapid wear.

SUMMARY OF THE INVENTON

The object of the invention is that of providing a sealing assembly of the above-described type, in particular, adapted for railway axle bearings, capable of exercising a high sealing efficiency, entirely comparable to that of known sliding labyrinth seal assemblies, but having substantially no friction and great durability.

The said object is achieved by the invention in that it relates to a sealing assembly which can be interposed between two relatively rotatable members substantially to seal an annular cavity defined between the said members in a fluid-tight manner, particularly for railway axle bearings, of the type comprising a rigid baffle which can be fitted securely to the radially outermost member and a sealing element rigidly carried by and projecting from the said rigid baffle and able to cooperate with the radially inner member or with an element to which the said radially inner member is connected, characterised by the fact that the said rigid baffle includes a fixing portion which can be fixed rigidly to the said radially outer member, and a sleeve portion coaxial with the said fixing portion and projecting with respect thereto, the said sleeve portion being firmly fixed at its free end to the said sealing element and to a cup-shape cover fixed in a removable manner to an edge of the said free end, the said cover substantially closing the free end of the said sleeve portion of the baffle in a fluid-tight manner and, with it, the said annular cavity, and the said sealing element being provided with a plurality of radial non-sliding ribs which can cooperate with the radially inner member and with the said element fixed to it to define a labyrinth seal.

BRIEF DESCRIPTION OF THE DRAWINGS

For a better understanding of the invention a non-limitative description of its embodiment will now be given with reference to the attached drawings, in which:

FIG. 2 is a section taken on the line II—II of detail of FIG. 1; and

FIG. 3 is a view turned through 90° of the detail of FIG. 2.

DETAILED DESCRIPTION OF THE INVENTION

Figure 1:
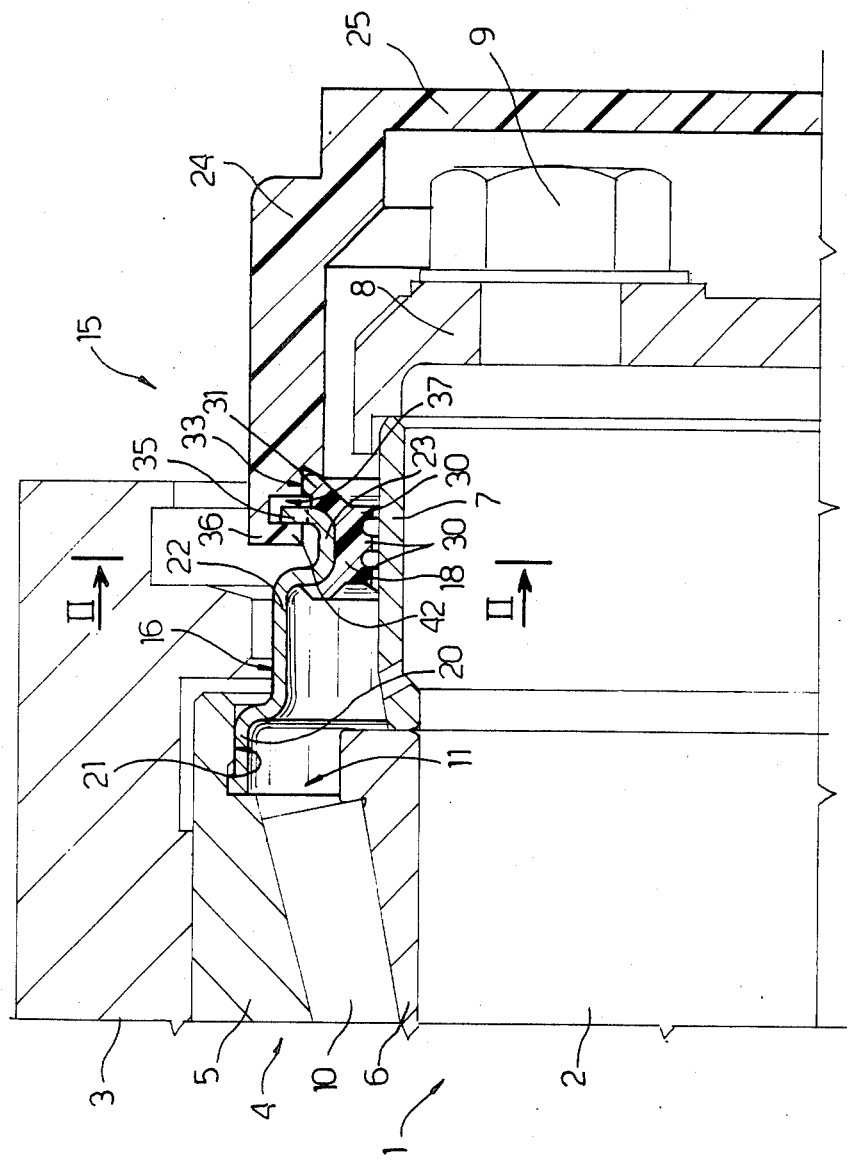
FIG. 1 is a longitudinal partially sectioned view of a railway axle of known type provided with a bearing having the seal assembly according to the invention.

With reference to FIG. 1, a railway axle of known type is generally indicated with the reference numeral 1 and comprises a shaft 2 and a support 3 between which is interposed a taper roller bearing 4 which can render the shaft 2 carrying the wheels rotatable with low friction with respect to the support 3 fixed rigidly to the wagon, not illustrated for simplicity; the bearing 4 includes an outer ring 5 fixed to the support 3, an inner ring 6 fixed to the shaft 2 and axially locked on this by means of a spacer ring 7 and a flange 8 clamped by screws 9 frontally on the shaft 2, and a plurality of rolling bodies 10 interposed between the rings 6 and 5 and housed in an annular cavity 11 defined between the rings 6 and 5, which when the wagon is in movement are in relative rotation. The bearing 4 is provided with a sealing assembly 15 which can close the cavity 11 from the outside in a substantially fluid-tight manner in such a way as to prevent the escape therefrom of the lubricant and simultaneously prevent the ingress of external contaminants such as water and dust, such sealing assembly 15 comprises a rigid baffle 16, preferably metal, which can be fixed firmly to the outer ring 5 or to the outermost of those members defining the cavity 11 to be protected, and a deformable element 18, preferably made of elastomeric material directly vulcanised onto the baffle 16, carried securely by and projecting from the baffle 16 on the radially inner part thereof and able to cooperate with the ring 6 or, in the illustrated example, with the spacer ring 7, to define with it a seal, or to cooperate with the radially inner member of those defining the cavity 11 to be protected or with an element rigidly connected and adjacent to this latter.

According to the invention the baffle 16 includes a annular fixing portion 20, preferably of greater diameter, which can be coupled by force fitting on a seat 21 of the outer ring 5 angularly rigidly connected thereto and an annular portion 20 of axially elongate form shaped as a sleeve, preferably of smaller diameter, which is coaxial with the portion 20 and projects axially with respect thereto, preferably out from the axial encumbrance of the rings 5 and 6. The free end of the portion 22 is provided with an annular, substantially U-shape edge 23 to which a rigid cup-shape cover 24, preferably made of synthetic plastics materials, is fixed in a removable manner; the cover 24, the bottom of which is delimited by a flat wall 25 with no apertures, closes off both the free end of the sleeve portion 22 and, with it, the cavity 11 from the outside in a substantially fluid-tight manner, in a way which will be described. The elastomeric element 18, on the other hand, is fixed on the radially inner part of the baffle 16 exactly in correspondence with the edge 23 and includes a plurality of radially inner, non-sliding ribs 30, three in number of relatively high rigidity and able to cooperate with the outer surface of the ring 7 to define with it a labyrinth seal of known type; the element 18 further includes, according to the invention, a resiliently deformable annular lip 31 projecting in a preidominantly radial direction from the edge 23 towards the cover 24 and cooperating to form a fluid-tight seal, when the cover 24 is mounted on the edge 23, with an annular frontal seat 33 of the cover 24 having, preferably, a transverse asymmetrical V-shape section and formed on the part opposite the bottom wall 25; the lip 31 has, in its relaxed condition, dimensions such as to interfere in use with the cover 24 and therefore to be resiliently deformed by this in compression when the cover 24 is firmly fixed to the baffle 16 in such a way as to exert on the cover 24, by resilient reaction, an outwardly directed axial thrust of pre-determined magnitude, which has the purpose of forming a seal with the seat 33 and moreover of maintaining the coupling between the cover 24 and the edge 23, in a manner which will be explained hereinbelow.

Referring also to FIGS. 2 and 3, the baffle 16 and the cover 24 include, according to the invention, bayonet coupling means in combination with axial shoulder means disposed angularly offset with respect to the bayonet means. In particular, the edge 23 includes at least one radially outer tongue 35, but preferably the tongues 35 are at least two in number, formed in diametrically opposite positions and extending radially in opposite directions from the axis of symmetry of the screeen 16, whilst the cover 24 includes an annular frontal portion 36 internally provided with at least one associated circumferential recess 37 for each tongue 35, able to house the tongue itself within it and including in turn a first portion 38 accessible from the side facing towards the edge 23 through an associated circumferential frontal window 40 formed facing the edge 23, and a second portion 39, angularly offset with respect to the portion 38 by an arc of several tens of degrees (FIGS. 2 and 3) and closed towards the baffle 16 by a respective, radially inner, shoulder tongue 42 formed on the portion 36 coplanar with the corresponding window 40 of the portion 38 and adjacent thereto. This tongue 42 is provided on the side facing the recess 37 with a tooth or stop projection 50 (FIG. 3) extending in an axial direction with respect to the sleeve 22 and able to cooperate with the tongue 25 to prevent any relative rotation of the cover 24 with respect to the baffle 16 and to cooperate with the edge 23 of this latter, upon fitting the cover 24 thereon; to allow the connection and disconnection by manual action of a user, the recess 37 is formed in such a way as to have an axial depth greater than the height of the tooth 50, and the lip 31 is utilised in the functional assembly 15 as a spring in that the cover 24 coupled to the edge 23 maintains the tongue 35 pressed against the axial shoulder tongue 42 for closure of the portion 39 of the recess 37, thanks to the said axial thrust exerted on the cover 24 by the resilient reaction.

In use, when the baffle 16 is fixed in a known manner onto its sealing element 18 on the bearing 4, a first seal is already obtained by the labyrinth action of the ribs 30 which, whilst not touching the surface of the ring 7 (or, in a variant not illustrated for simplicity, directly the outer surface of the ring 6 of the bearing) forms with it a tortuous path for access to the cavity 11; this seal achieves the objects of the invention as far as the absence of friction is concerned and therefore the low wear and energy saving, but has a sealing efficiency against external contaminants which is entirely insufficient. With the baffle 16 installed, the cover 24 is then installed by operating in the following manner: the cover 24 is presented frontally with the portion 36 facing the edge 23, taking care to dispose the windows 40 facing the tongues 35; then the cover 24 is pressed axially against the edge 23 in such a way as to deform the annular lip 31 and to introduce the tongues 35 in the portion 38 of the recesses 37 through the windows 40; then the cover 24 is made to perform a rotation through several tens of degrees in a sense such as to carry the tongues 34 into the portions 39 of the recesses 37, and then the cover 24 is released; this, under the axial resilient thrust of the lip 31 becomes axially spaced from the edge 23 carrying the tongues 35 to press against the tongues 42 thus blocking any possible unscrewing due to vibrations in use, since any rotation in a sense such as to bring the tongues 35 into the open portions 38 of the recesses 37 is prevented by the teeth 50. To dismantle the cover 24 when necessary, for example for operation on the screws 9, the cover 24 is again pressed against the edge 23 overcoming the resistance of the lip 31, and then the cover 24 is turned in the opposite sense from before, thus freeing the tongues 35 from the tongues 42, the resilient resistance of the lip 31 then causes automatic expulsion of the cover 24. It is clear that the cooperation of the lip 31 against the cover 24 also gives a significant sealing action both against contaminants and against lubricant; in practice the cover 24 closes the cavity 11 with a completely fluid-tight seal and the efficiency of the seal of the lip 31 is greater than that of conventional sliding lip seals since the cover 24, being fixed to the baffle 16, exerts a static seal. Moreover, for the same reasons, there is no friction and, therefore, no dissipation of energy or wear of the sealing lip.

I claim:

1. A sealing assembly which can be interposed between two relatively rotatable members substantially to seal an annular cavity defined between the said members in a fluid-tight manner, particularly for railway axle bearings, of the type comprising a rigid baffle which can be fitted securely to the radially outermost member and a sealing element rigidly carried by and projecting from the said rigid baffle and able to cooperate with the radially inner member or with an element to which the said radially inner member is connected, characterised by the fact that the said rigid baffle includes a fixing portion which can be fixed rigidly to the said radially outer member, and a sleeve portion coaxial with the said fixing portion and projecting with respect thereto, the said sleeve portion being firmly fixed at its free end to the said sealing element and to a cup-shape cover fixed in a removable manner to an edge of the said free end, the said cover substantially closing the free end of the said sleeve portion of the baffle in a fluid-tight manner and, with it, the said annular cavity, and the said sealing element being provided with a plurality of radial non-sliding ribs which can cooperate with the radially inner member and with the said element fixed to it to define a labyrinth seal.

2. A sealing assembly according to claim 1, characterised in that the said seal element includes a resiliently deformable lip which projects in a predominantly axial direction from the said edge of the sleeve portion towards the said cover, the said lip cooperating to form a fluid-tight seal with an annular seat frontally formed on the said cover opposite a bottom wall thereof, and having dimensions such as to be resiliently compressed by the said cover when this latter is fixed to the said edge, in such a way as to exert on the cover, by resilient reaction, an axial thrust of pre-determined magnitude.

3. A seal assembly according to claim 2, characterised in that the said frontal annular seat of the cover has an asymmetric V-shape in transverse section.

4. A seal assembly according to claim 2, characterised in that the said cover and sleeve portion of the rigid baffle include bayonet coupling means in combination with axial shoulder means disposed angularly offset with respect to the bayonet means.

5. A sealing assembly according to claim 4, characterised in that the said edge of the free end of the sleeve portion of the rigid baffle includes at least one radial tongue extending externally of the sleeve portion, and in that, in combination, the said cover includes a frontal annular portion provided internally with at least one associated circumferential recess operable to house the said tongue and including a first portion accessible from the side facing the said edge through an associated frontal circumferential window formed facing the said edge, and a second portion, angularly offset with respect to the first, closed towards the said rigid baffle by a respective radially inner shoulder tongue formed on the said frontal portion of the cover coplanar with the said frontal window and adjacent thereto.

6. A sealing assembly according to claim 5, characterised in that the said radially inner shoulder tongue of the said cover is provided on the side of the said circumferential recess with a stop tooth cooperable with the said radially outer tongue of the edge of the rigid baffle to prevent rotation of the said cover with respect to the said edge, the said circumferential recess having an axial depth greater than the height of the said tooth and the said lip of the said deformable element holding the said shoulder tongue of the cover pressed against the said radially outer tongue of the edge of the rigid baffle.

* * * * *